United States Patent
Funabashi

(10) Patent No.: US 12,049,179 B2
(45) Date of Patent: Jul. 30, 2024

(54) VEHICLE-INTERIOR MONITORING SYSTEM, VEHICLE-INTERIOR MONITORING APPARATUS, AND NON-TRANSITORY COMPUTER-READABLE STORAGE MEDIUM HAVING VEHICLE-INTERIOR MONITORING PROGRAM STORED THEREON

(71) Applicant: DENSO CORPORATION, Kariya (JP)

(72) Inventor: Junichirou Funabashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 241 days.

(21) Appl. No.: 17/804,973

(22) Filed: Jun. 1, 2022

(65) Prior Publication Data
US 2022/0289129 A1 Sep. 15, 2022

Related U.S. Application Data

(63) Continuation of application No. PCT/JP2020/044235, filed on Nov. 27, 2020.

(30) Foreign Application Priority Data

Dec. 4, 2019 (JP) ................. 2019-219456

(51) Int. Cl.
*G06V 20/59* (2022.01)
*B60H 1/00* (2006.01)
(Continued)

(52) U.S. Cl.
CPC ......... *B60R 16/03* (2013.01); *B60H 1/00735* (2013.01); *G06V 20/59* (2022.01); *H04W 4/48* (2018.02)

(58) Field of Classification Search
CPC .... G06V 20/59; G06V 20/593; G06V 20/597; G06V 20/56; G05D 1/0038;
(Continued)

(56) References Cited

U.S. PATENT DOCUMENTS

2015/0369872 A1* 12/2015 Meyer ................ B60L 58/13
702/63
2016/0207414 A1 7/2016 Watanabe et al.
(Continued)

FOREIGN PATENT DOCUMENTS

| JP | 2010-113494 A | 5/2010 |
| JP | 2013-018361 A | 1/2013 |
| JP | 2016-062414 A | 4/2016 |

*Primary Examiner* — Kenneth J Malkowski
(74) *Attorney, Agent, or Firm* — MASCHOFF BRENNAN

(57) ABSTRACT

An in-vehicle unit, which is installed in a vehicle, determines whether a remote process is to be performed on the basis of a remaining amount of an energy usable by this unit. When the remote process is determined not to be performed, the in-vehicle unit recognizes a target in an interior of a vehicle and determines a situation in the interior of the vehicle on the basis of a result of recognition. When the remote process is determined to be performed, the in-vehicle unit sends sensor information to a vehicle-interior monitoring support apparatus, which performs processes similar to the above in-vehicle recognition and the above in-vehicle determination, and receives a result of determination on the situation in the interior of the vehicle by the support apparatus. The in-vehicle unit performs a monitoring control related to the interior of the vehicle on the basis of the result of determination.

11 Claims, 6 Drawing Sheets

(51) Int. Cl.
*B60R 16/03* (2006.01)
*H04W 4/48* (2018.01)

(58) Field of Classification Search
CPC .. G05D 1/0011; G05D 1/0016; G05D 1/0022;
B60W 50/14
See application file for complete search history.

(56) References Cited

U.S. PATENT DOCUMENTS

| | | | |
|---|---|---|---|
| 2018/0029500 A1* | 2/2018 | Katanoda | B60W 20/11 |
| 2019/0197859 A1* | 6/2019 | Kanehara | G06V 20/10 |
| 2021/0191398 A1* | 6/2021 | Chen | G05D 1/0022 |
| 2022/0156870 A1* | 5/2022 | Jiang | G06Q 20/326 |

* cited by examiner

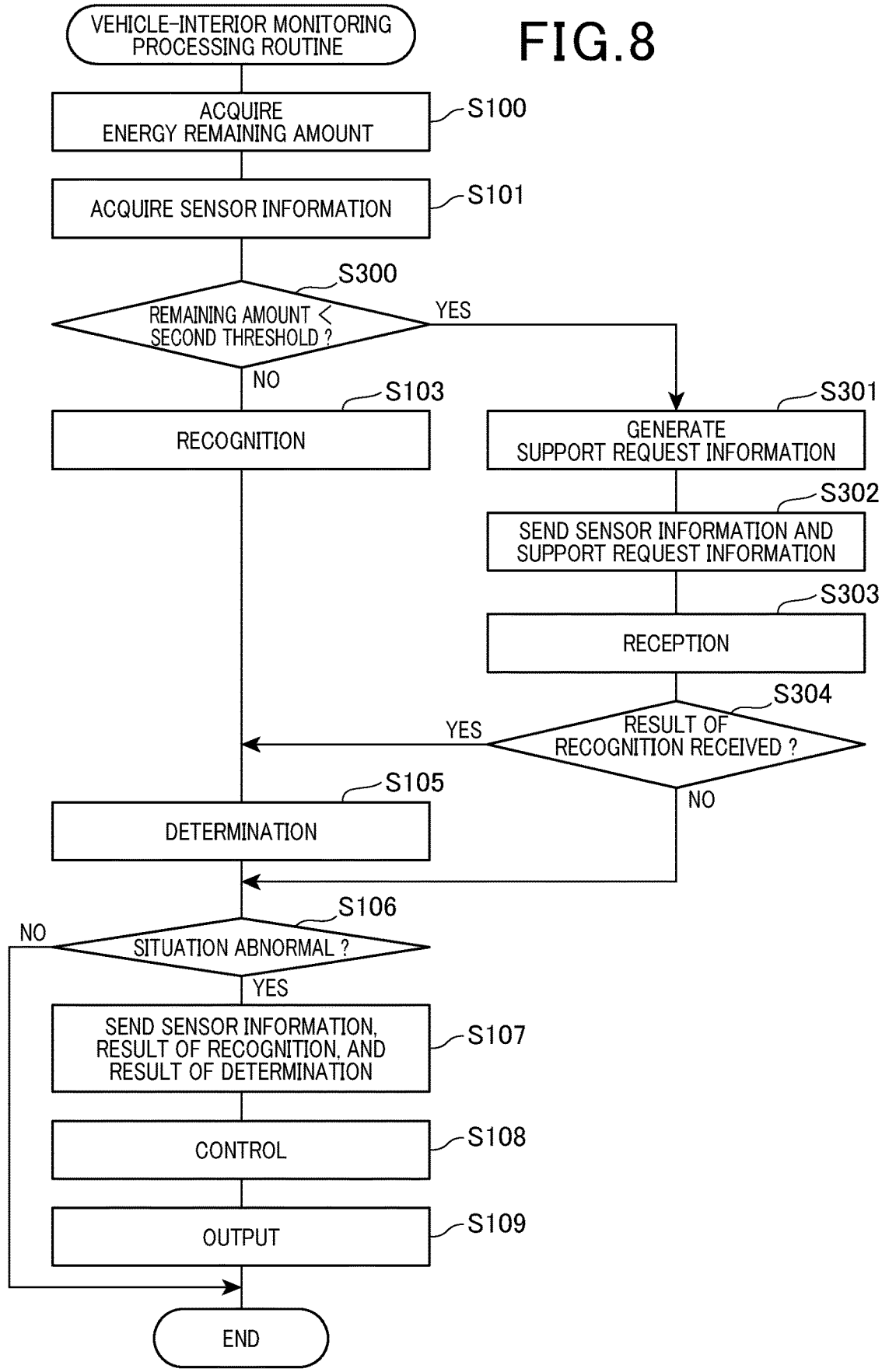

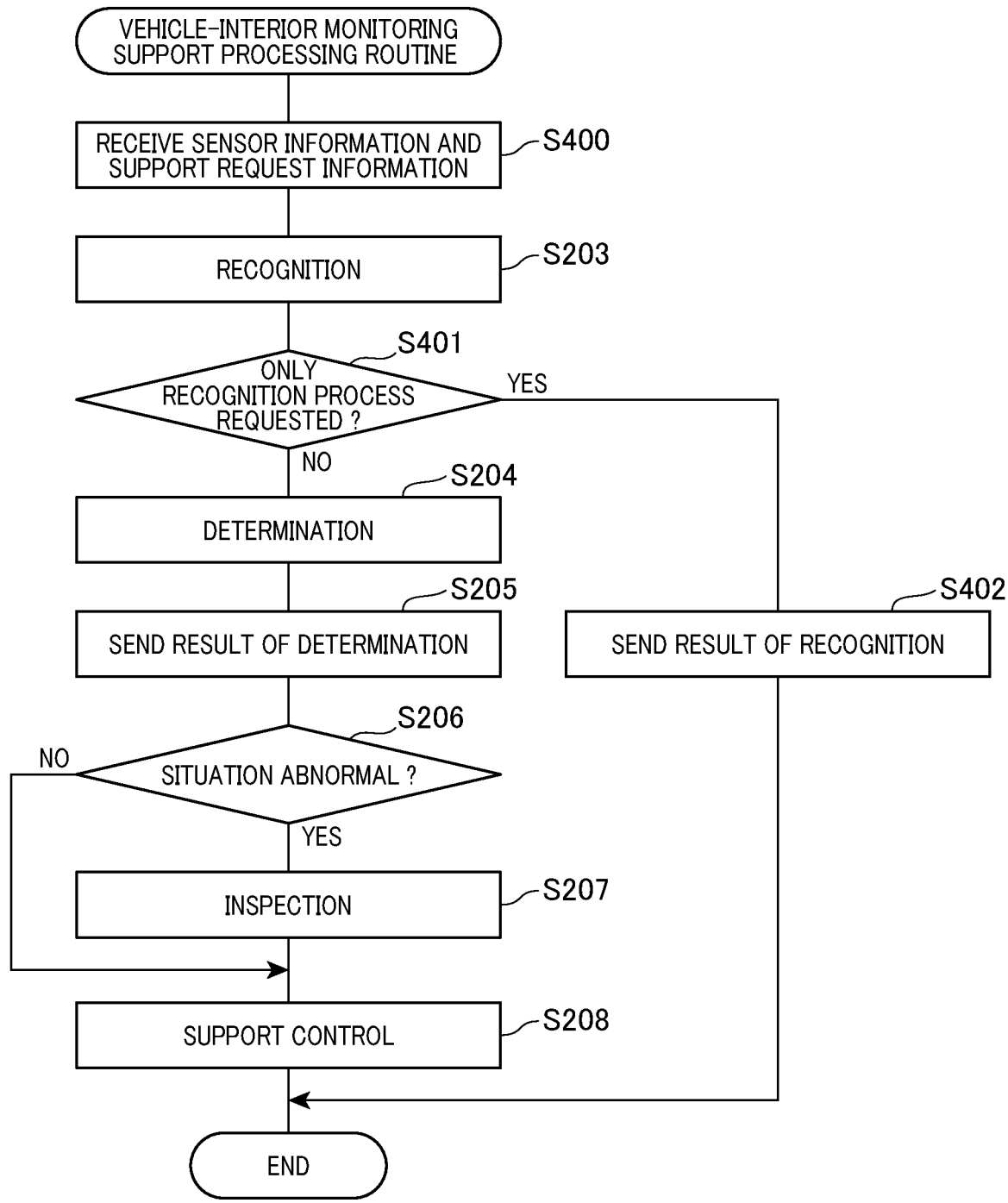

VEHICLE-INTERIOR MONITORING SYSTEM, VEHICLE-INTERIOR MONITORING APPARATUS, AND NON-TRANSITORY COMPUTER-READABLE STORAGE MEDIUM HAVING VEHICLE-INTERIOR MONITORING PROGRAM STORED THEREON

CROSS-REFERENCE TO RELATED APPLICATION

The present application is a continuation application of International Application No. PCT/JP2020/044235, filed on Nov. 27, 2020, which claims priority to Japanese Patent Application No. 2019-219456, filed on Dec. 4, 2019. The contents of these applications are incorporated herein by reference in their entirety.

BACKGROUND

1. Technical Field

The present disclosure relates to a technique for monitoring a vehicle interior.

2. Related Art

In the field of autonomous vehicles, study has been performed on vehicle-interior monitoring in order to monitor a vehicle interior to prevent crime or accidents in a vehicle. For example, camera footage or the like is processed to analyze a situation for the purpose of preventing crime or accidents in a public transport vehicle in which a large number of people ride together.

SUMMARY

The present disclosure provides a vehicle-interior monitoring system. As one aspect of the present disclosure, a vehicle-interior monitoring system includes an in-vehicle unit installed in a vehicle and a vehicle-interior monitoring support apparatus. The in-vehicle unit determines whether a remote process is to be performed on the basis of a remaining amount of an energy usable by the in-vehicle unit. In response to determining that the remote process is not to be performed, the in-vehicle unit recognizes a target in an interior of the vehicle and determines a situation in the interior of the vehicle on the basis of a result of recognition. In response to determining that the remote process is to be performed, the in-vehicle unit sends sensor information to the vehicle-interior monitoring support apparatus, which performs processes similar to the above in-vehicle recognition and the above in-vehicle determination, and receives a result of determination on the situation in the interior of the vehicle by the vehicle-interior monitoring support apparatus. The in-vehicle unit performs a monitoring control related to the interior of the vehicle on the basis of the result of determination.

BRIEF DESCRIPTION OF THE DRAWINGS

In the accompanying drawings:

FIG. 8 is a flowchart illustrating a vehicle-interior monitoring processing routine according to a second embodiment; and FIG. 9 is a flowchart illustrating a vehicle-interior monitoring support processing routine according to the second embodiment.

DETAILED DESCRIPTION OF THE PREFERRED EMBODIMENTS

Figure 1:
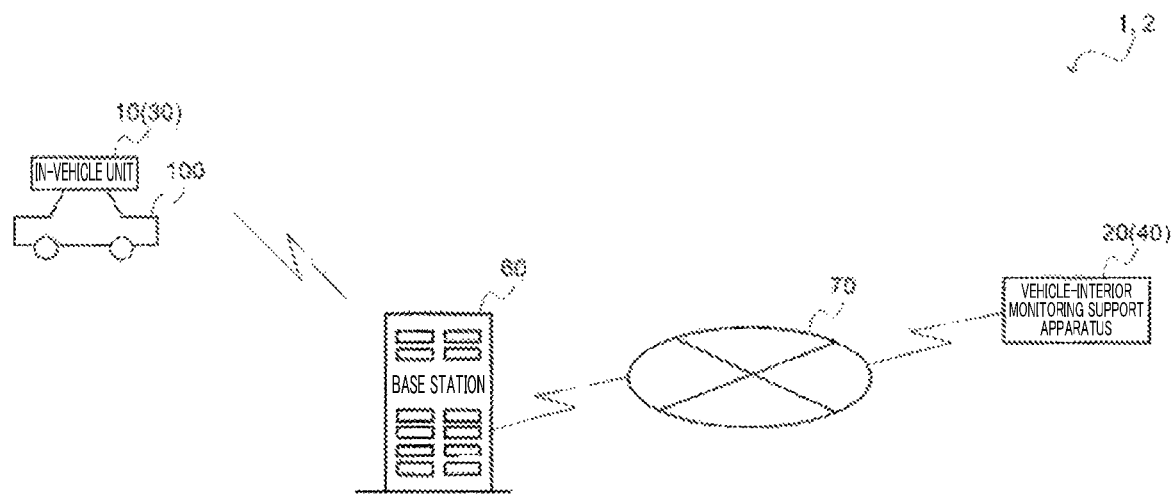
FIG. 1 is a block diagram illustrating a configuration of a vehicle-interior monitoring system.

In the field of autonomous vehicles, a technique of monitoring in an interior of a vehicle is studied in order to prevent crime or accidents in the vehicle. For example, according to JP 2016-062414 A (patent application publication), camera footage or the like is processed to analyze a situation for the purpose of preventing crime or accidents in a public transport vehicle in which a large number of people ride together.

However, in the field of autonomous vehicles, while a monitoring system needs to manage various types of monitoring, installable functions in the monitoring system are disadvantageously limited in terms of costs, installation conditions, and energy consumption. In addition, even in a case where all the functions are installed in the monitoring system, energy usable by the autonomous vehicle is likely to become insufficient due to an increase in energy consumption.

One or more aspects of the present disclosure are directed to a technique of performing vehicle-interior monitoring with accuracy even when a remaining energy amount is insufficient.

A vehicle-interior monitoring system according to the present disclosure includes an in-vehicle unit installed in a vehicle and a vehicle-interior monitoring support apparatus. The in-vehicle unit includes an energy acquirer, an in-vehicle acquirer, a performing determiner, an in-vehicle recognizer, an in-vehicle determiner, an in-vehicle communicator, and an in-vehicle controller. The vehicle-interior monitoring support apparatus includes a remote communicator, a remote recognizer, and a remote determiner. The energy acquirer is configured to acquire an energy remaining amount that is a remaining amount of an energy usable by the in-vehicle unit. The in-vehicle acquirer is configured to acquire sensor information regarding a target in an interior of the vehicle. The performing determiner is configured to determine whether a remote process is to be performed on the basis of the energy remaining amount. The in-vehicle recognizer is configured to recognize, in a case where the performing determiner determines that the remote process is not to be performed, the target in the interior of the vehicle on the basis of the sensor information. The in-vehicle determiner is configured to determine a situation in the interior of the vehicle on the basis of a result of recognition by the in-vehicle recognizer. The in-vehicle communicator is configured to send, in a case where the performing determiner determines that the remote process is to be performed, the sensor information to the vehicle-interior monitoring support apparatus. The remote communicator is configured to receive the sensor information. The remote recognizer is configured to recognize the target in the interior of the vehicle on the basis of the sensor information received by the remote communicator. The remote determiner is configured to determine the situation in the interior of the vehicle on the basis of a result of recognition by the remote recognizer. The remote communicator is configured to send a result of determination by the remote determiner to the in-vehicle unit. The in-vehicle communicator is configured to receive the result of determination by the remote determiner. The in-vehicle controller is configured to perform a monitoring control related to the interior of the vehicle on the basis of a result of determination by the in-vehicle determiner or the result of determination by the remote determiner.

In addition, a vehicle-interior monitoring apparatus according to the present disclosure is a vehicle-interior monitoring apparatus installed in a vehicle, the vehicle-interior monitoring apparatus including an energy acquirer, an in-vehicle acquirer, a performing determiner, an in-vehicle recognizer, an in-vehicle determiner, an in-vehicle communicator, and an in-vehicle controller. The energy acquirer is configured to acquire an energy remaining amount that is a remaining amount of an energy usable by the vehicle-interior monitoring apparatus. The in-vehicle acquirer is configured to acquire sensor information regarding a target in an interior of the vehicle. The performing determiner being configured to determine whether a remote process is to be performed on the basis of the energy remaining amount. The in-vehicle recognizer is configured to recognize, in a case where the performing determiner determines that the remote process is not to be performed, the target in the interior of the vehicle on the basis of the sensor information. The in-vehicle determiner is configured to determine a situation in the interior of the vehicle on the basis of a result of recognition by the in-vehicle recognizer. The in-vehicle communicator is configured to send, in a case where the performing determiner determines that the remote process is to be performed, the sensor information to a vehicle-interior monitoring support apparatus configured to perform similar processes to recognition by the in-vehicle recognizer and determination by the in-vehicle determiner. The in-vehicle communicator is configured to receive a result of determination on the situation in the interior of the vehicle by the vehicle-interior monitoring support apparatus. The in-vehicle controller is configured to perform a monitoring control related to the interior of the vehicle on the basis of a result of determination by the in-vehicle determiner or the result of determination by the vehicle-interior monitoring support apparatus.

In addition, a storage medium according to the present disclosure is a non-transitory computer-readable storage medium storing a vehicle-interior monitoring program for causing a computer to perform a process, the process including: an energy acquirer acquiring an energy remaining amount that is a remaining amount of an energy usable by a computer; an in-vehicle acquirer acquiring sensor information regarding a target in an interior of a vehicle; a performing determiner determining whether a remote process is to be performed on the basis of the energy remaining amount; an in-vehicle recognizer recognizing the target in the interior of the vehicle on the basis of the sensor information in a case where the performing determiner determines that the remote process is not to be performed; an in-vehicle determiner determining a situation in the interior of the vehicle on the basis of a result of recognition by the in-vehicle recognizer; an in-vehicle communicator sending, in a case where the performing determiner determines that the remote process is to be performed, the sensor information to a vehicle-interior monitoring support apparatus configured to perform similar processes to recognition by the in-vehicle recognizer and determination by the in-vehicle determiner; an in-vehicle communicator receiving a result of determination on the situation in the interior of the vehicle by the vehicle-interior monitoring support apparatus; and an in-vehicle controller performing a monitoring control related to the interior of the vehicle on the basis of a result of determination by the in-vehicle determiner or the result of determination by the vehicle-interior monitoring support apparatus.

In the vehicle-interior monitoring system, the vehicle-interior monitoring apparatus, and the vehicle-interior monitoring program according to the present disclosure, the energy acquirer acquires the energy remaining amount, that is, the remaining amount of an energy usable by a computer. The in-vehicle acquirer acquires the sensor information regarding a target in the interior of the vehicle, and the performing determiner determines whether a remote process is to be performed on the basis of the energy remaining amount.

Then, the in-vehicle recognizer recognizes, in a case where the performing determiner determines that the remote process is not to be performed, the target in the interior of the vehicle on the basis of the sensor information. The in-vehicle determiner determines a situation in the interior of the vehicle on the basis of a result of recognition by the in-vehicle recognizer. The in-vehicle communicator sends, in a case where the performing determiner determines that the remote process is to be performed, the sensor information to the vehicle-interior monitoring support apparatus, which performs processes similar to the recognition by the in-vehicle recognizer and the determination by the in-vehicle determiner. The in-vehicle communicator receives the result of determination on the situation in the interior of the vehicle by the vehicle-interior monitoring support apparatus. The in-vehicle controller performs a monitoring control related to the interior of the vehicle on the basis of the result of determination by the in-vehicle determiner or the result of determination by the vehicle-interior monitoring support apparatus.

As described above, it is determined whether a remote process is to be performed on the basis of the acquired energy remaining amount; in a case where the remote process is determined not to be performed, a target in the interior of the vehicle is recognized and the situation in the interior of the vehicle is determined on the basis of a result of recognition; in a case where the remote process is determined to be performed, the sensor information is sent to the vehicle-interior monitoring support apparatus, which performs similar processes to the recognition by the in-vehicle recognizer and the determination by the in-vehicle determiner, a result of determination on the situation in the interior of the vehicle by the vehicle-interior monitoring support apparatus is received, and a monitoring control related to the interior of the vehicle is performed on the basis of the result of determination. This makes it possible to perform vehicle-interior monitoring with accuracy even when the energy remaining amount is insufficient.

The vehicle-interior monitoring system, vehicle-interior monitoring apparatus, and vehicle-interior monitoring program of the present disclosure are allowed to perform vehicle-interior monitoring with accuracy even when a remaining energy amount is insufficient.

The above-described object and other objects, features, and advantages of the present disclosure will be further clarified by the following detailed description with reference to the attached drawings.

Description will be made below on embodiments of the present disclosure with use of the drawings.

<Configuration of Vehicle-Interior Monitoring System According to First Embodiment of Present Disclosure>

A vehicle-interior monitoring system 1 according to an embodiment of the present disclosure will be described with reference to FIG. 1. FIG. 1 is a block diagram illustrating a configuration of the vehicle-interior monitoring system 1 according to a first embodiment of the present disclosure. As illustrated in FIG. 1, the vehicle-interior monitoring system 1 according to the first embodiment of the present disclosure includes an in-vehicle unit 10 installed in a vehicle 100, a vehicle-interior monitoring support apparatus 20, a base station 60, and a network 70. It should be noted that the vehicle-interior monitoring system 1 will be described by taking as an example a case where the vehicle 100 with the in-vehicle unit 10 installed performs autonomous driving. The vehicle 100, which is a vehicle capable of transporting a target, may be, for example, a bus in a case where the target is a person or a truck in a case where the target is an article (including an animal). In the present disclosure, description will be given by taking, as an example, a case where the target is a person and the vehicle 100 is a bus.

The base station 60 is a wireless base station connected to the network 70 and that communicates with the in-vehicle unit 10 by wireless communication. The network 70 is a public network such as the internet or wide-area ethernet. In other words, the in-vehicle unit 10 and the vehicle-interior monitoring support apparatus 20 are configured such that they can communicate with each other through the base station 60 and the network 70.

An energy measuring apparatus and a sensor (not illustrated) connectable to the in-vehicle unit 10 by wire or wirelessly are also installed in the vehicle 100. The energy measuring apparatus is an apparatus that measures a remaining amount of an energy usable by the in-vehicle unit 10. The energy measuring apparatus monitors the energy usable by the in-vehicle unit 10 as disclosed in, for example, Japanese Patent No. 6191349 B. Examples of the energy include a variety of energies such as electric power within a battery, the amount of gasoline, and hydrogen. The sensor is an apparatus that acquires information regarding the vehicle interior. For example, a camera, a thermometer, a vibration sensor, a laser radar, an ultrasonic sensor, or a millimeter-wave sensor is usable as the sensor. In the present disclosure, description will be given by taking, as an example, a case where the energy is electric power and the sensor is a camera that captures an image of the interior of the vehicle 100. The energy measuring apparatus and the camera pass the energy remaining amount and a captured image to the in-vehicle unit 10.

The in-vehicle unit 10 performs an autonomous driving control. A configuration of the in-vehicle unit 10 will be described with reference to FIG. 2 and FIG. 3.

Figure 2:
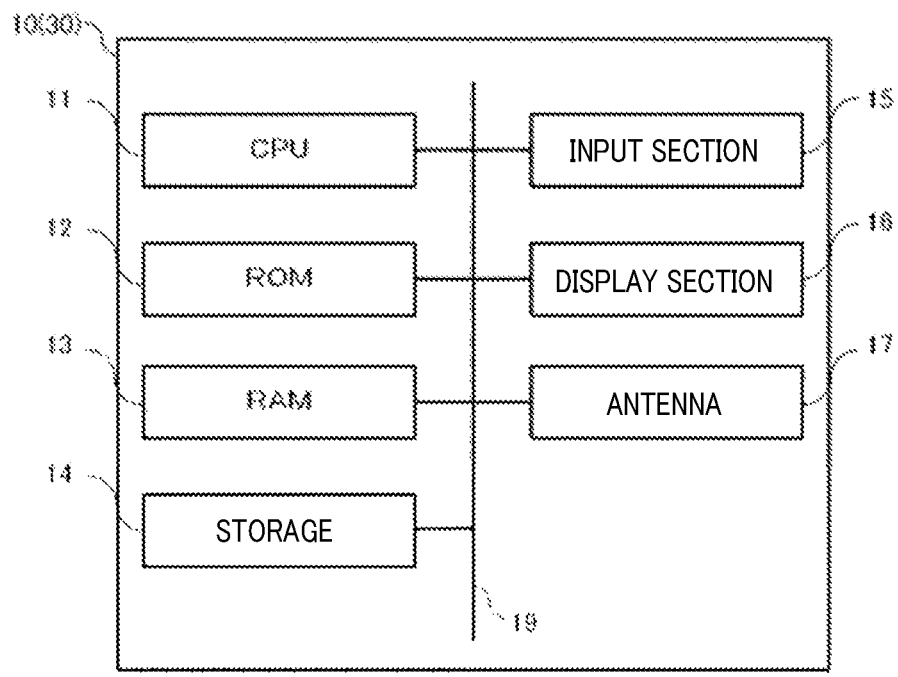
FIG. 2 is a block diagram illustrating a hardware configuration of an in-vehicle unit.

FIG. 2 is a block diagram illustrating a hardware configuration of the in-vehicle unit 10 according to the present embodiment. As illustrated in FIG. 2, the in-vehicle unit 10 includes a CPU (Central Processing Unit) 11, a ROM (Read Only Memory) 12, a RAM (Random Access Memory) 13, a storage 14, an input section 15, a display section 16, and an antenna 17. The components are connected to each other through a bus 19 such that they can communicate with each other.

The CPU 11, which is a central processing unit, executes a variety of programs and controls the sections. In other words, the CPU 11 reads a program from the ROM 12 or the storage 14 and executes the program by using the RAM 13 as a workspace. The CPU 11 controls the above-described components and performs a variety of arithmetic processes in line with the program stored in the ROM 12 or the storage 14. In the present embodiment, a vehicle-interior monitoring program for performing a vehicle-interior monitoring process is stored in the ROM 12 or the storage 14.

The ROM 12 stores a variety of programs and a variety of data. The RAM 13 temporarily stores a program or data as a workspace. The storage 14, which includes an HDD (Hard Disk Drive) or an SSD (Solid State Drive), stores a variety of programs including an operating system and a variety of data.

The input section 15, which includes a pointing device such as a mouse, a keyboard, and a voice input device, is usable for performing a variety of inputs. The display section 16, which is, for example, a liquid crystal display or a speaker, displays or reproduces a variety of information. The display section 16 may be in the form of a touch panel to function as the input section 15. The antenna 17, which is a wireless communication antenna for wireless communication with another equipment, uses, for example, standards such as LTE, 5G or Wi-Fi®.

Figure 3:
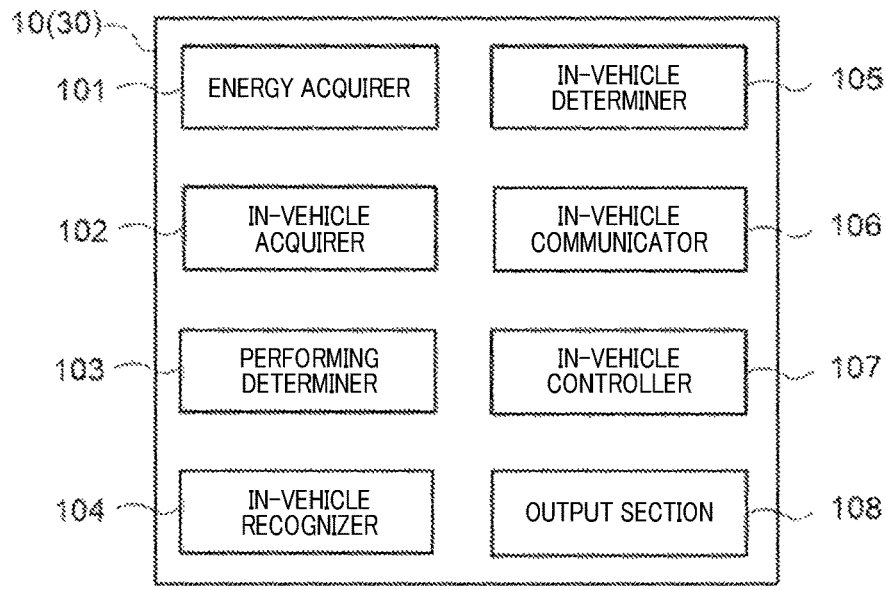
FIG. 3 is a block diagram illustrating a functional configuration of the in-vehicle unit.

FIG. 3 is a block diagram illustrating a functional configuration of the in-vehicle unit 10 according to the present embodiment. As illustrated in FIG. 3, the in-vehicle unit 10 according to the present embodiment includes an energy acquirer 101, an in-vehicle acquirer 102, a performing determiner 103, an in-vehicle recognizer 104, an in-vehicle determiner 105, an in-vehicle communicator 106, an in-vehicle controller 107, and an output section 108.

The energy acquirer 101 acquires an energy remaining amount, that is, a remaining amount of an energy usable by the in-vehicle unit 10, from the energy measuring apparatus. The energy acquirer 101 then passes the acquired energy remaining amount to the performing determiner 103.

The in-vehicle acquirer 102 acquires sensor information regarding a target in the interior of the vehicle 100. Specifically, the in-vehicle acquirer 102 acquires video footage captured by a camera that captures an image of the interior of the vehicle 100 in a predetermined cycle. The in-vehicle acquirer 102 then passes the acquired video footage to the performing determiner 103.

The performing determiner 103 determines, on the basis of the energy remaining amount, whether a remote process is to be performed. Specifically, the performing determiner 103 categorizes the energy remaining amount in, for example, three levels (High, Mid, Low), determining whether a remote process is to be performed by the vehicle-interior monitoring support apparatus 20 in accordance with the level and determining contents of the remote process. For example, the level of the energy remaining amount may be Low in a case where the energy remaining amount is lower than a first threshold, Mid in a case where the energy remaining amount is equal to or higher than the first threshold and equal to or lower than a second threshold, and High in a case where the energy remaining amount is higher than the second threshold.

In a case where the level of the energy remaining amount is High, there is a sufficient energy and the energy is usable for monitoring. Accordingly, vehicle-interior monitoring is performed by the in-vehicle unit 10. Specifically, the in-vehicle recognizer 104 and the in-vehicle determiner 105 perform recognition and determine a situation. In this case, the performing determiner 103 passes sensor information to the in-vehicle recognizer 104.

In contrast, in a case where the level of the energy remaining amount is Mid or Low, the use of the energy for monitoring carries a high risk. Accordingly, a monitoring function is partly entrusted to the vehicle-interior monitoring support apparatus 20. A function of at least either one of the in-vehicle recognizer 104 and the in-vehicle determiner 105, which implement the monitoring function, is entrusted to the vehicle-interior monitoring support apparatus 20. More specifically, in a case where the level of the energy remaining amount is Low, the performing determiner 103 passes sensor information to the in-vehicle communicator 106 and causes the in-vehicle communicator 106 to send the sensor information to the vehicle-interior monitoring support apparatus 20. In contrast, in a case where the level of the energy remaining amount is Mid, the performing determiner 103 entrusts only the function of the in-vehicle determiner 105 to the vehicle-interior monitoring support apparatus 20. In this case, the performing determiner 103 passes sensor information to the in-vehicle recognizer 104 and causes the in-vehicle recognizer 104 to pass the sensor information and a result of recognition to the in-vehicle communicator 106. In other words, the performing determiner 103 causes the in-vehicle communicator 106 to send the sensor information and the result of recognition to the vehicle-interior monitoring support apparatus 20.

In a case where the performing determiner 103 determines that the remote process is not to be performed, the in-vehicle recognizer 104 recognizes a target in the interior of the vehicle 100 on the basis of the sensor information. Specifically, in a case where the level of the energy remaining amount is Mid or High, with the assumption that the performing determiner 103 determines that a process is to be performed to recognize a person in the vehicle 100 from the video footage as the sensor information, by the remote process, the in-vehicle recognizer 104 performs a process to recognize a person in the vehicle 100 from images contained in the video footage by the remote process. As a means of recognition, for example, Reference Literature 1 below and any other means of recognition are usable.

[Reference Literature 1]: S. Ren, K. He, R. Girshick, and J. Sun, "Faster R-CNN: Towards real-time object detection with region proposal networks," Advances in Neural Information Processing Systems 28, May 2015, pp. 91-99.

Then, the in-vehicle recognizer 104 passes the video footage and the result of recognition to the in-vehicle communicator 106 in a case of being instructed to pass them to the in-vehicle communicator 106 by the performing determiner 103, whereas passing them to the in-vehicle determiner 105 in a case of not being instructed to pass them to the in-vehicle communicator 106 by the performing determiner 103.

In a case where the performing determiner 103 determines that a remote process is not to be performed for a determination process, the in-vehicle determiner 105 determines a situation in the interior of the vehicle 100 on the basis of the result of recognition by the in-vehicle recognizer 104 and a current scene of the vehicle 100.

Specifically, the in-vehicle determiner 105 first acquires the current scene from the in-vehicle controller 107. The current scene refers to a scene where the vehicle 100 is currently placed, examples of which include 'on standby', 'in service as normal', 'in service as abnormal (in service not as normal)', and 'stopped.' In the present disclosure, description will be given by taking, as an example, a case where the current scene is 'in service as normal' or 'in service as abnormal.'

In a case where the current scene is 'in service as normal', the in-vehicle determiner 105 determines, on the basis of the result of recognition by the in-vehicle recognizer 104, which one of 'normal', 'caution needed', and 'abnormal' the situation in the interior of the vehicle 100 is. Specifically, the in-vehicle determiner 105 applies, for example, a technique of human posture estimation (Reference Literature 2) or the like to the result of recognition by the in-vehicle recognizer 104, thereby detecting postures of a person in the interior of the vehicle 100 at a plurality of points of time.

[Reference Literature 2] A. Toshev and C. Szegedy, "DeepPose: Human pose estimation via deep neural networks," Proc. Computer Vision and Pattern Recognition 2014, Columbus, USA, June 2014, pp. 3476-3483.

Next, the in-vehicle determiner 105 determines whether the person recognized in the interior of the vehicle 100 is in a posture as normal from the postures at the plurality of points of time. The posture as normal is, for example, a posture such as "being seated" or "standing and grabbing a handrail or a strap" in the bus. In a case where the detected posture is a normal posture, the in-vehicle determiner 105 determines that the situation in the interior of the vehicle 100 is 'normal.' In contrast, in a case where the detected posture is not the normal posture, the in-vehicle determiner 105 determines that the situation in the interior of the vehicle 100 is 'abnormal.' The in-vehicle determiner 105 then passes the result of determination to the in-vehicle controller 107.

In addition, in a case where the current scene is 'in service as abnormal', the in-vehicle determiner 105 likewise determines, on the basis of the result of recognition by the in-vehicle recognizer 104, whether the person recognized in the interior of the vehicle 100 is in the normal posture as normal. In a case where the result of determination is 'abnormal', the in-vehicle determiner 105 passes the result of determination to the in-vehicle controller 107. Further, the in-vehicle determiner 105 passes the result of determination to the in-vehicle communicator 106. This is because it is necessary to inspect the current situation in more detail if the result of determination is 'abnormal' during 'in service as normal' In the present embodiment, since the detailed inspection requires a large amount of consumption energy, the vehicle-interior monitoring support apparatus 20 is caused to inspect the situation in the interior of the vehicle 100 in more detail. In contrast, unless the result of determination is 'abnormal', the in-vehicle determiner 105 passes the result of determination to the in-vehicle controller 107.

The in-vehicle communicator 106 sends data passed from the processing sections to the vehicle-interior monitoring support apparatus 20. Specifically, the in-vehicle communicator 106 sends, among the sensor information, the result of recognition, and the result of determination, acquired data to the vehicle-interior monitoring support apparatus 20.

In addition, in a case of sending the sensor information or the result of recognition to the vehicle-interior monitoring support apparatus 20 is performed, the in-vehicle communicator 106 receives the result of determination by the remote determiner 203 from the vehicle-interior monitoring support apparatus 20. The in-vehicle communicator 106 then passes the received result of determination to the in-vehicle controller 107.

The in-vehicle controller 107 performs a control related to the interior of the vehicle 100 on the basis of the result of determination by the in-vehicle determiner 105 or the result of determination by the remote determiner 203. Specifically, the in-vehicle controller 107 performs a control to give a caution or a countermeasure instruction on the basis of the result of determination by the in-vehicle determiner 105 or the remote determiner 203.

For example, in a case where the current scene is 'in service as normal', the in-vehicle controller 107 determines whether the control related to the interior of the vehicle 100 is necessary on the basis of the result of determination by the in-vehicle determiner 105 or the result of determination by the remote determiner 203. More specifically, in a case where the result of determination is 'normal', the in-vehicle controller 107 determines that the control related to the interior of the vehicle 100 is not necessary. It should be noted that the control, which is a special control for vehicle-interior monitoring, is different from other controls such as a normal vehicle control. In contrast, the result of determination is 'abnormal', the in-vehicle controller 107 determines that the control related to the interior of the vehicle 100 is necessary. In a case where the control is necessary, the in-vehicle controller 107 determines, as the control, contents of a caution corresponding to the posture in accordance with the detected posture. A posture-caution correspondence for the in-vehicle controller 107 can be provided by, for example, creating a correspondence table in advance. For example, in a case where the in-vehicle determiner 105 detects that a person is in a walking posture in the interior of the vehicle 100 in service, it is determined to give a caution to prompt the person to be seated. The contents of the control are then passed to the output section 108.

In addition, in a case where the current scene is 'in service as abnormal', the in-vehicle controller 107 determines whether the control related to the interior of the vehicle 100 is necessary on the basis of the result of determination by the in-vehicle determiner 105 or the result of determination by the remote determiner 203. More specifically, in a case where the result of determination is 'normal', the in-vehicle controller 107 determines that the control related to the interior of the vehicle 100 is not necessary. In contrast, in a case where the result of determination is 'abnormal', the in-vehicle controller 107 determines that the control related to the interior of the vehicle 100 is necessary. In a case where the control is necessary, the in-vehicle controller 107 determines, as the control, contents of a countermeasure corresponding to the posture in accordance with the detected posture. A posture-countermeasure correspondence for the in-vehicle controller 107 can be provided by, for example, creating a correspondence table in advance. For example, in a case where the in-vehicle determiner 105 detects that a person with a knife is in the vehicle 100 in service, it is determined to perform a countermeasure of displaying an indication to encourage the person to put the knife away. The contents of the control are then passed to the output section 108.

The output section 108 outputs the contents of a vehicle interior control performed by the in-vehicle controller 107. Specifically, in a case where the contents of the vehicle interior control involve a caution, the output section 108 at least either displays the caution or reproduces audio data of the caution. In addition, in a case where the contents of the vehicle interior control involve a countermeasure, the output section 108 likewise at least either displays a countermeasure instruction or reproduces audio data of the countermeasure instruction.

Figure 4:
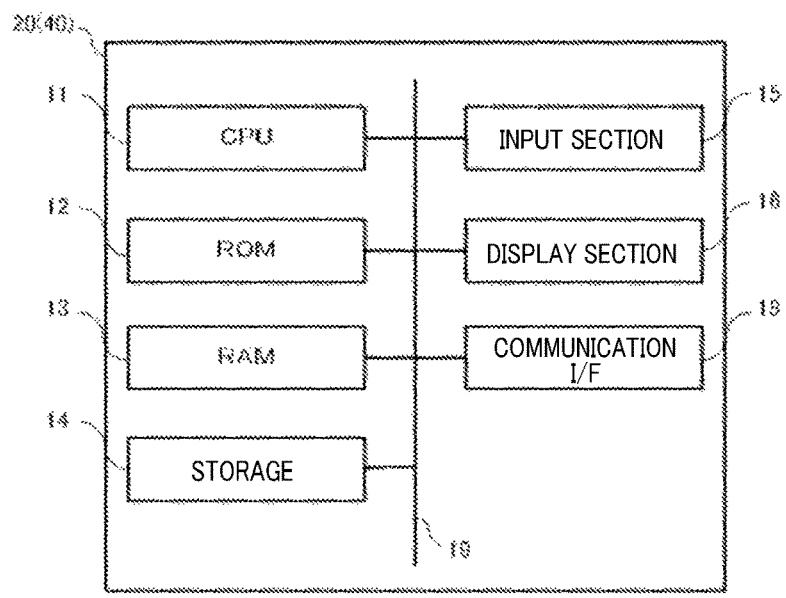
FIG. 4 is a block diagram illustrating a hardware configuration of a vehicle-interior monitoring support apparatus.

The vehicle-interior monitoring support apparatus 20 performs traveling support for a vehicle to perform autonomous driving in the vehicle-interior monitoring system according to an embodiment of the present disclosure. Description will be made on a configuration of the vehicle-interior monitoring support apparatus 20 according to the embodiment of the present disclosure with reference to FIG. 4 and FIG. 5. FIG. 4 is a block diagram illustrating a hardware configuration of the vehicle-interior monitoring support apparatus 20 according to the present embodiment. As illustrated in FIG. 4, the vehicle-interior monitoring support apparatus 20 includes the CPU 11, the ROM 12, the RAM 13, the storage 14, the input section 15, the display section 16, and a communication interface (I/F) 18. The components are connected to each other through the bus 19 such that they can communicate with each other. It should be noted that description on hardware similar to the in-vehicle unit 10 will be omitted. In the vehicle-interior monitoring support apparatus 20, a vehicle-interior monitoring support program for performing a vehicle-interior monitoring support process is stored in the ROM 12 or the storage 14.

The communication interface 18, which is an interface for communication with another equipment, uses, for example, standards such as Ethernet®, FDDI, Wi-Fi®, or the like.

Figure 5:
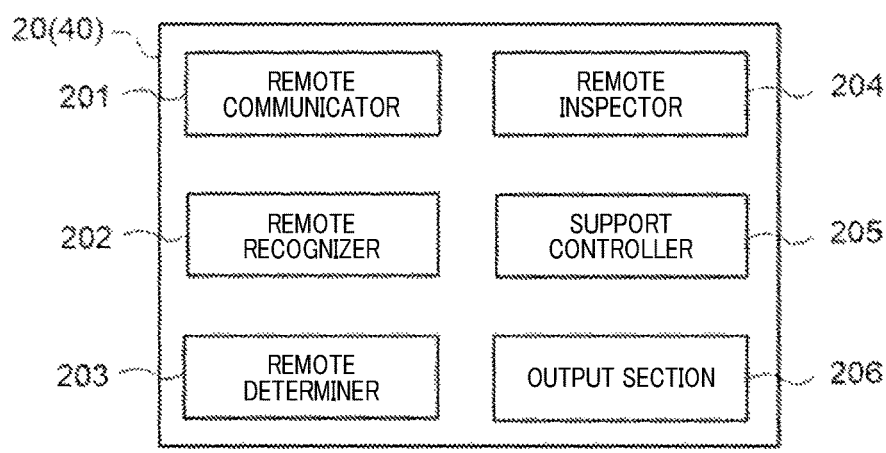
FIG. 5 is a block diagram illustrating a functional configuration of the vehicle-interior monitoring support apparatus.

Next, description will be made on a functional configuration of the vehicle-interior monitoring support apparatus 20. FIG. 5 is a block diagram illustrating an example of the functional configuration of the vehicle-interior monitoring support apparatus 20. As illustrated in FIG. 5, the vehicle-interior monitoring support apparatus 20 according to the present embodiment includes a remote communicator 201, a remote recognizer 202, a remote determiner 203, a remote inspector 204, a support controller 205, and an output section 206.

The remote communicator 201 receives data from the in-vehicle unit 10. Specifically, the remote communicator 201 receives data containing at least one of sensor information, a result of recognition, and a result of determination sent from the in-vehicle communicator 106. In a case of receiving sensor information only, the remote communicator 201 passes the sensor information to the remote recognizer 202 and the support controller 205. In contrast, in a case of receiving sensor information and a result of recognition, the remote communicator 201 passes the sensor information and the result of recognition to the remote determiner 203. In contrast, in a case of receiving sensor information, a result of recognition, and a result of determination, the remote communicator 201 passes the sensor information and the result of recognition to the remote inspector 204.

In addition, the remote communicator 201 sends the result of determination by the remote determiner 203 to the in-vehicle unit 10.

The remote recognizer 202 recognizes a target in the interior of the vehicle 100 on the basis of the sensor information received by the remote communicator 201. Specifically, the remote recognizer 202 recognizes the target in the same manner as the in-vehicle recognizer 104. At this time, the remote recognizer 202 may recognize the target by using a means of recognition that is higher in accuracy than a means of recognition used by the in-vehicle recognizer 104. For example, the remote recognizer 202 only has to recognize the target with a higher resolution of each image in a video footage than the in-vehicle recognizer 104. In other words, the remote recognizer 202, which is less limited in terms of energy consumption than the in-vehicle recognizer 104, can appropriately support the in-vehicle unit 10 by virtue of the use of a higher-performance means of recognition. Alternatively, the recognition may be performed at a higher sampling rate or by using a larger number of images, a wider variety of sensor information, or sensor information that is higher in quality than that used by the in-vehicle recognizer 104. It should be noted that for later-described determination or inspection as well as the recognition, a means that is higher in performance than that for the determination or inspection in the in-vehicle unit 10 may also be used. The remote recognizer 202 then passes the result of recognition to the remote determiner 203.

The remote determiner 203 determines a situation in the interior of the vehicle 100 on the basis of the result of recognition by the in-vehicle recognizer 104 or the result of recognition by the remote recognizer 202. Specifically, the remote determiner 203 determines whether the situation in the interior of the vehicle 100 is 'normal' or 'abnormal' on the basis of the result of recognition received by the remote communicator 201 or the result of recognition by the remote recognizer 202. The remote determiner 203 performs the determination as the in-vehicle determiner 105. In a case where the result of determination is 'normal', the remote determiner 203 passes the result of determination to the remote communicator 201 and the support controller 205. In addition, in a case where the result of determination is 'abnormal', the remote determiner 203 passes the result of recognition and the result of determination to the remote inspector 204.

In a case where the result of determination by the remote determiner 203 is 'abnormal', the remote inspector 204 inspects a degree of abnormality of the situation in the interior of the vehicle 100 is on the basis of the result of recognition by the remote recognizer 202.

Specifically, the remote inspector 204 determines whether the situation in the interior of the vehicle 100 is minor or critical on the basis of the sensor information and the result of recognition. The remote inspector 204 estimates an action of a person in the interior of the vehicle 100 from the images in the video footage and the result of recognition. As for a method of inspection, estimation may be performed by, for example, performing posture recognition by above-described Reference Literature 2 and applying a technique of Reference Literature 3.

[Reference Literature 3] Tomoyuki Suzuki, Yoshimitsu Aoki, "Kodo Sen-i Eizo niokeru Shisei Tokucho wo Chushin tosuru Gakushu wo Mochiita Jikeiretsu Koudou Ninshiki (temporal action recognition by learning focused on features of posture for videos in which actions are transitioning)", Journal of the Japan Society for Precision Engineering, Ver. 83, No. 12, 2017, pp. 1156-1165.

Next, the remote inspector 204 determines whether the estimated action is minor or critical. For example, with critical actions being listed in advance, the remote inspector 204 may determine whether the estimated action is minor or critical in accordance with whether the action matches any of the actions in the list. This method of determination is not limiting and the remote inspector 204 may use any other method of determination. The remote inspector 204 then passes the result of inspection to the support controller 205.

In addition, in a case where the result of determination by the in-vehicle determiner 105 is 'abnormal', the remote inspector 204 likewise inspects the degree of abnormality of the situation in the interior of the vehicle 100 is on the basis of the result of recognition by the in-vehicle recognizer 104. The remote inspector 204 then passes the result of inspection to the support controller 205.

The support controller 205 generates support information for supporting the vehicle 100 in accordance with the result of inspection by the remote inspector 204. Specifically, the support controller 205 generates support information in accordance with the result of inspection and the action of the person in the interior of the vehicle 100. For example, in a case where the result of inspection is 'critical' and the action of the person is "falling over", support information indicating "call staff" is generated. In contrast, for example, the result of inspection is 'minor', the support controller 205 generates no support information. This is because as long as it is 'minor', it is sufficient to merely entrust it to a control by the in-vehicle controller 107 implemented by the in-vehicle unit 10. The support controller 205 then passes the generated support information to the output section 206. In addition, the support controller 205 causes data used for inspection and the result of inspection to be held in a situation management database (not illustrated).

In addition, the support controller 205 causes the received sensor information and the result of recognition by the remote recognizer 202 or the received result of recognition and the result of determination to be held in the situation management database. The variety of data held in the situation management database is usable for improvement in analysis accuracy or checking by a person.

The output section 206 outputs the support information generated by the support controller 205. For example, in a case where the support information indicates "call staff", the support information is passed to a device (not illustrated) for calling staff (notifying staff).

<Workings of Vehicle-Interior Monitoring System According to First Embodiment of Present Disclosure>

Figure 6:
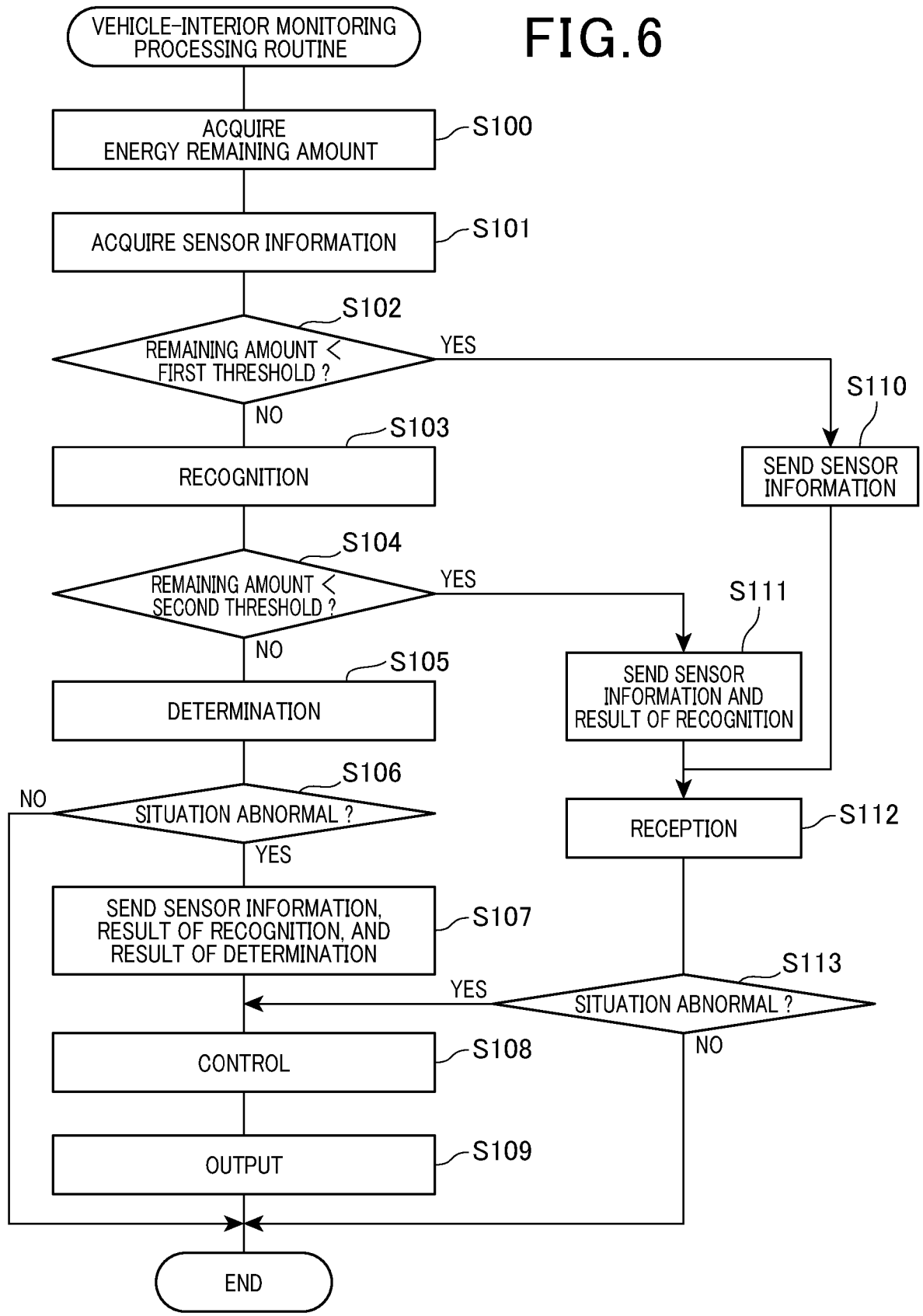
FIG. 6 is a flowchart illustrating a vehicle-interior monitoring processing routine according to a first embodiment.

FIG. 6 is a flowchart illustrating a vehicle-interior monitoring processing routine of the in-vehicle unit 10 according to the first embodiment of the present disclosure. A timing for starting the process may be a regular or desired timing In Step S100, the energy acquirer 101 acquires an energy remaining amount, that is, the remaining amount of an energy usable by the in-vehicle unit 10, from the energy measuring apparatus.

In Step S101, the in-vehicle acquirer 102 acquires sensor information regarding a target in the interior of the vehicle 100.

In Step S102, the performing determiner 103 determines whether the energy remaining amount is lower than first threshold.

In a case where the energy remaining amount is not lower than the first threshold (NO in above-described Step S102), the in-vehicle recognizer 104 recognizes a target in the interior of the vehicle 100 on the basis of the sensor information acquired in above-described Step S101 in Step S103.

In Step S104, the performing determiner 103 determines whether the energy remaining amount is lower than the second threshold.

In a case where the energy remaining amount is not lower than the second threshold (NO in above-described Step S104), the in-vehicle determiner 105 determines a situation in the interior of the vehicle 100 on the basis of the result of recognition acquired in above-described Step S103 in Step S105.

In Step S106, the in-vehicle controller 107 determines whether the result of determination acquired in above-described Step S105 is 'abnormal.'

In a case where the result of determination is not 'abnormal' (NO in above-described Step S106), the process is terminated. In contrast, in a case where the result of determination is 'abnormal' (YES in above-described Step S106), the in-vehicle communicator 106 sends the sensor information acquired in above-described Step S101, the result of recognition acquired in above-described Step S103, and the result of determination acquired in above-described Step S105 to the vehicle-interior monitoring support apparatus 20 in Step S107.

In Step S108, the in-vehicle controller 107 performs a control related to the interior of the vehicle 100 on the basis of the result of determination acquired in above-described Step S105.

In Step S109, the output section 108 outputs the contents of the vehicle interior control performed by the in-vehicle controller 107 in above-described Step S108 and the process is terminated.

In contrast, in a case where the energy remaining amount is lower than the first threshold (YES in above-described Step S102), the in-vehicle communicator 106 sends the sensor information acquired in above-described Step S101 to the vehicle-interior monitoring support apparatus 20 in Step S110.

In addition, in a case where the energy remaining amount is lower than the second threshold (YES in above-described Step S104), the in-vehicle communicator 106 sends the sensor information acquired in above-described Step S101 and the result of recognition acquired in above-described Step S103 to the vehicle-interior monitoring support apparatus 20 in Step S111.

In Step S112, the in-vehicle communicator 106 receives the result of determination by the remote determiner 203.

In Step S113, the in-vehicle controller 107 determines whether the result of determination received in above-described Step S112 is 'abnormal.'

In a case where the result of determination is 'abnormal' (YES in above-described Step S113), the process proceeds to Step S108. In this case, the in-vehicle controller 107 performs a control related to the interior of the vehicle 100 on the basis of the result of determination acquired in above-described Step S113 in Step S108. In contrast, the result of determination is not 'abnormal' (NO in above-described Step S113), the process is terminated.

Figure 7:
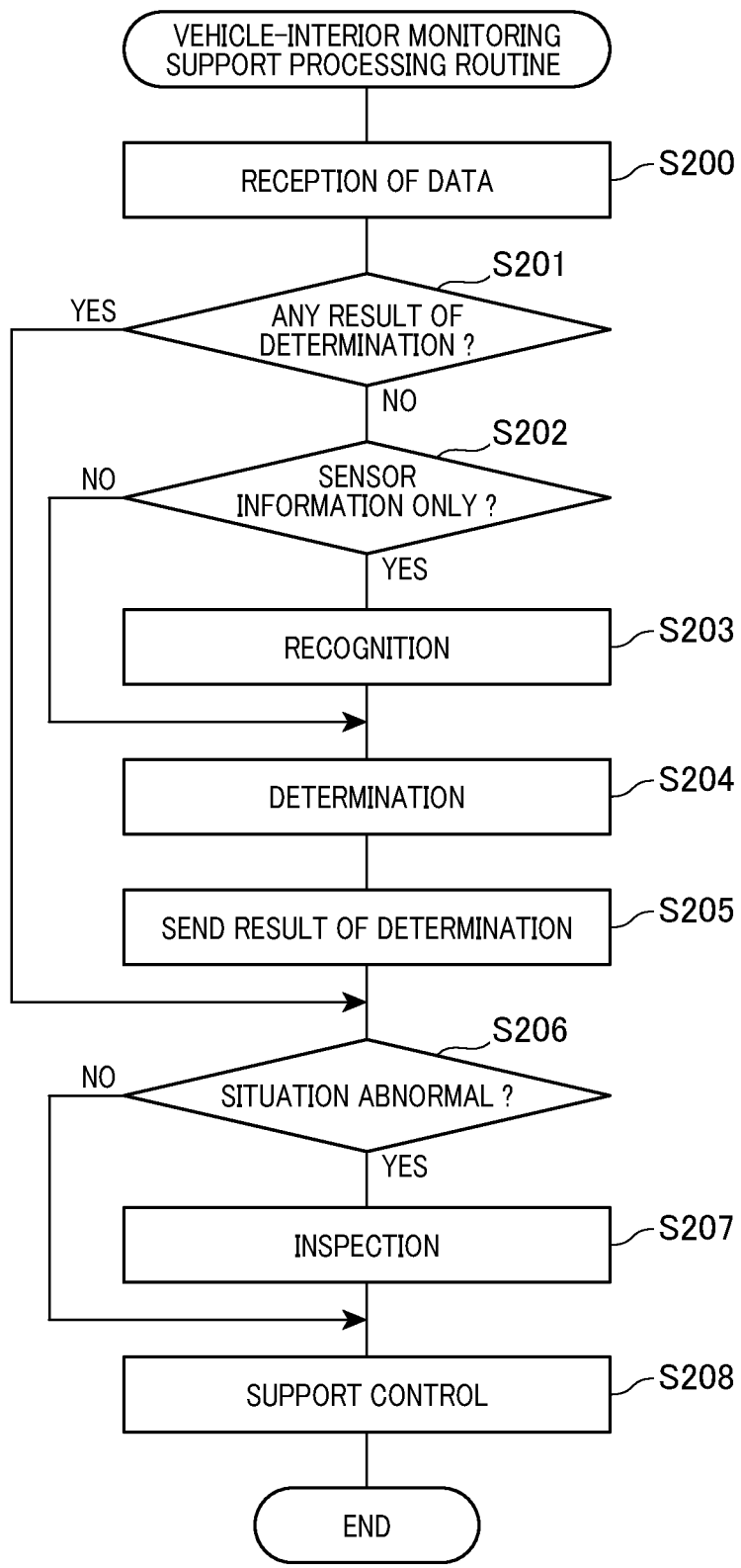
FIG. 7 is a flowchart illustrating a vehicle-interior monitoring support processing routine according to the first embodiment.

FIG. 7 is a flowchart illustrating a vehicle-interior monitoring support processing routine of the vehicle-interior monitoring support apparatus 20 according to the first embodiment of the present disclosure. The process is performed every time when the remote communicator 201 receives data from the in-vehicle unit 10.

In Step S200, the remote communicator 201 receives data from the in-vehicle unit 10.

In Step S201, the remote communicator 201 determines whether a result of determination is contained in the received data.

In a case where the result of determination is contained (YES in above-described Step S201), the process proceeds to Step S206.

In contrast, in a case where no result of determination is contained (NO in above-described Step S201), the remote communicator 201 determines whether the received data is the sensor information only in Step S202.

In a case where it is not the sensor information only (NO in above-described Step S202), the process proceeds to Step S204.

In contrast, in a case where it is the sensor information only (YES in above-described Step S202), the remote recognizer 202 recognizes a target in the interior of the vehicle 100 on the basis of the sensor information received in above-described Step S200 in Step S203.

In Step S204, the remote determiner 203 determines a situation in the interior of the vehicle 100 on the basis of the result of recognition received in above-described Step S200 or the result of recognition acquired in above-described Step S203.

In Step S205, the remote communicator 201 sends the result of determination acquired in above-described Step S204 to the in-vehicle unit 10.

In Step S206, the remote inspector 204 determines whether the result of determination is 'abnormal.'

In a case where the result of determination is not 'abnormal' (NO in above-described Step S206), the process proceeds to Step S208. In contrast, in a case where the result of determination is 'abnormal' (YES in above-described Step S206), the remote inspector 204 inspects the degree of abnormality of the situation in the interior of the vehicle 100 is on the basis of the result of recognition received in above-described Step S200 or the result of recognition acquired in above-described Step S203 in Step S207.

In Step S208, the support controller 205 performs a support control on the basis of the data acquired in above-described Steps S200 to S207 and the process is terminated.

As described hereinbefore, the vehicle-interior monitoring system according to the first embodiment of the present disclosure: determines whether a remote process is to be performed on the basis of the acquired energy remaining amount; in a case where the remote process is determined not to be performed, recognizes a target in the interior of the vehicle and determines a situation in the interior of the vehicle on the basis of a result of recognition; and in a case where the remote process is determined to be performed, sends sensor information to the vehicle-interior monitoring support apparatus, which performs similar processes to the recognition by the in-vehicle recognizer and the determination by the in-vehicle determiner, receives a result of determination on the situation in the interior of the vehicle by the vehicle-interior monitoring support apparatus, and performs a control related to the interior of the vehicle on the basis of the result of determination. This makes it possible to perform vehicle-interior monitoring with accuracy even when the energy remaining amount is insufficient.

In addition, the sensor information is sent to the vehicle-interior monitoring support apparatus in a case where the energy remaining amount is lower than the first threshold, whereas the result of recognition is sent to the vehicle-interior monitoring support apparatus in a case where the energy remaining amount is equal to or higher than the first threshold and equal to or lower than the second threshold, which makes it possible to perform vehicle-interior monitoring with accuracy with consumption of energy corresponding to the energy remaining amount reduced.

In addition, the vehicle-interior monitoring support apparatus uses a means of recognition that is higher in accuracy than a means of recognition used by the in-vehicle unit 10 to recognize the target, which makes it possible to perform vehicle-interior monitoring with accuracy with consumption of energy reduced in the in-vehicle unit 10.

<Other Examples of Scene>

In the above-described embodiment, the description is made by taking as an example the case where the current scene is 'in service as normal' or 'in service as abnormal'; however, this is not limiting. Implementation may be performed only in either case, implementation may be performed only in another scene, or implementation may be performed in combination with another scene. Description will be given by taking, as an example, a case where the other scene is only a 'stopped' scene. It should be noted that a configuration is similar to that of the above-described vehicle-interior monitoring system 1 and the contents of the process in the functional block vary with scene; therefore, the same references signs are used in the description. The configuration except a part particularly specified is similar to that of the above-described embodiment.

A case where the scene is 'stopped', for example, a person may be boarding the vehicle 100. In this case, it is assumed that an article left behind such as an umbrella is a target. In other words, an article left behind is recognized at the recognition and it is determined whether there is an article left behind at the determination.

Specifically, the sensor information acquired by the in-vehicle acquirer 102 is an image. The in-vehicle acquirer 102 acquires an image captured immediately before stop and an image captured during stop from the camera. The in-vehicle acquirer 102 then passes, as the sensor information, the image captured immediately before stop and the image captured during stop to the performing determiner 103.

In a case where the level of the energy remaining amount is High, the performing determiner 103 passes sensor information to the in-vehicle recognizer 104. In contrast, in a case where the level of the energy remaining amount is Low, the performing determiner 103 passes sensor information to the in-vehicle communicator 106 and causes the in-vehicle communicator 106 to send the sensor information to the vehicle-interior monitoring support apparatus 20. In contrast, in a case where the level of the energy remaining amount is Mid, the performing determiner 103 entrusts only the function of the in-vehicle determiner 105 to the vehicle-interior monitoring support apparatus 20. In this case, the performing determiner 103 passes the sensor information to the in-vehicle recognizer 104 and orders the in-vehicle recognizer 104 to pass the sensor information and a result of recognition to the in-vehicle communicator 106. In other words, the performing determiner 103 causes the in-vehicle communicator 106 to send the sensor information and the result of recognition to the vehicle-interior monitoring support apparatus 20.

In a case where the performing determiner 103 determines that the remote process is not to be performed, the in-vehicle recognizer 104 recognizes a target in the interior of the vehicle 100 on the basis of the sensor information. Specifically, the in-vehicle recognizer 104 recognizes a target by, for example, a technique of obtaining a background difference between the image captured immediately before stop and the image captured during stop. Then, the in-vehicle recognizer 104 passes the result of recognition to the in-vehicle communicator 106 in a case of being ordered to pass it to the in-vehicle communicator 106 by the performing determiner 103, whereas passing it to the in-vehicle determiner 105 in a case of not being ordered to pass it to the in-vehicle communicator 106 by the performing determiner 103.

In a case where the performing determiner 103 determines that the remote process is not to be performed for the determination process, the in-vehicle determiner 105 determines a situation in the interior of the vehicle 100 on the basis of the result of recognition by the in-vehicle recognizer 104. Specifically, the in-vehicle determiner 105 determines whether the lost article is important on the basis of the result of recognition. For example, with respect to the result of recognition, similarity between the image of the lost article and each of important lost articles having been obtained is calculated and the lost article is determined to be an important lost article in a case where the similarity is equal to or higher than a predetermined value. Examples of important lost articles include a wallet and a smartphone. The in-vehicle determiner 105 then passes the result of determination to the in-vehicle communicator 106.

The in-vehicle communicator 106 sends the acquired data to the vehicle-interior monitoring support apparatus 20.

The remote communicator 201 receives the data from the in-vehicle unit 10. In a case of receiving the sensor information only, the remote communicator 201 passes the sensor information to the remote recognizer 202. In contrast, in a case of receiving the sensor information and the result of recognition, the remote communicator 201 passes the sensor information and the result of recognition to the remote determiner 203. In contrast, in a case of receiving the result of determination, the remote communicator 201 passes the sensor information, the result of recognition, and the result of determination to the support controller 205.

The remote recognizer 202 and the remote determiner 203 perform processes similar to those of the in-vehicle recognizer 104 and the in-vehicle determiner 105. The in-vehicle determiner 105 passes the result of determination to the support controller 205.

The support controller 205 generates, on the basis of the result of determination, support information for supporting the vehicle 100. Specifically, in a case where the result of determination is 'important lost article', the support controller 205 generates support information indicating "arrange to have a staff member come to the vehicle 100." It can be expected that the staff member promptly keeps the lost article to allow for speedier return. In contrast, in a case where the result of determination is not 'important lost article', the lost article is registered in a lost article database (not illustrated). The support controller 205 then passes the support information to the output section 206.

As described hereinbefore, in a variety of scenes in the vehicle 100, the configuration is applicable to monitor the vehicle and it can be expected that vehicle-interior monitoring is performed with accuracy even when the energy remaining amount is insufficient.

<Configuration of Vehicle-Interior Monitoring System According to Second Embodiment of Present Disclosure>

Next, description will be made on a configuration of a vehicle-interior monitoring system 2 according to a second embodiment. It should be noted that a component similar to that of the vehicle-interior monitoring system 1 according to the first embodiment is referred to by using the same reference sign and a detailed description thereof is omitted. In the first embodiment, a process being entrusted to the vehicle-interior monitoring support apparatus 20 is determined in accordance with the data sent to the vehicle-interior monitoring support apparatus 20. In the second embodiment, description will be given by taking, as an example, a case where a process being entrusted to a vehicle-interior monitoring support apparatus 40 is determined on an in-vehicle unit 30 side.

As illustrated in FIG. 3, an in-vehicle unit 30 according to the second embodiment includes the energy acquirer 101, the in-vehicle acquirer 102, the performing determiner 103, the in-vehicle recognizer 104, the in-vehicle determiner 105, the in-vehicle communicator 106, the in-vehicle controller 107, and the output section 108.

In a case where the energy remaining amount is lower than the first threshold, the performing determiner 103 generates support request information for causing the vehicle-interior monitoring support apparatus 20 to perform recognition by the remote recognizer 202 and determination by the remote determiner 203. In addition, in a case where the energy remaining amount is equal to or higher than the first threshold and equal to or lower than the second threshold, the performing determiner 103 generates support request information for causing the vehicle-interior monitoring support apparatus 20 to perform recognition by the remote recognizer 202. The performing determiner 103 then passes the support request information to the in-vehicle communicator 106.

The in-vehicle communicator 106 sends the support request information and the sensor information to the vehicle-interior monitoring support apparatus 20.

The in-vehicle communicator 106 also receives the result of recognition by the remote recognizer 202. The in-vehicle communicator 106 then passes the received result of recognition by the remote recognizer 202 to the in-vehicle determiner 105.

In a case where the performing determiner 103 determines that a remote process is to be performed, the in-vehicle determiner 105 determines a situation in the interior of the vehicle 100 on the basis of the result of recognition by the remote recognizer 202.

The vehicle-interior monitoring support apparatus 20 according to the second embodiment includes the remote communicator 201, the remote recognizer 202, the remote determiner 203, the remote inspector 204, the support controller 205, and the output section 206.

The remote communicator 201 receives the sensor information and the support request information sent from the in-vehicle communicator 106. The remote communicator 201 then passes the received support request information and sensor information to the remote recognizer 202.

In a case where the support request information is information for causing the remote recognizer 202 to perform recognition, the remote recognizer 202 passes the result of recognition to the remote communicator 201. In contrast, in a case where the support request information is information for causing the remote recognizer 202 to perform recognition and the remote determiner 203 to perform determination, the remote recognizer 202 passes the result of recognition to the remote determiner 203.

The remote communicator 201 sends the result of recognition by the remote recognizer 202 to the in-vehicle unit 10.

<Workings of Vehicle-Interior Monitoring System According to Second Embodiment of Present Disclosure>

FIG. 8 is a flowchart illustrating a vehicle-interior monitoring processing routine of the in-vehicle unit 30 according to the second embodiment. It should be noted that a process similar to that of the vehicle-interior monitoring support processing routine according to the first embodiment is referred to by using a same reference sign and a detailed description thereof is omitted. A timing for starting the process may be a regular or desired timing.

In Step S300, the performing determiner 103 determines whether the energy remaining amount is equal to or lower than second threshold.

In a case where the energy remaining amount is not equal to or lower than the second threshold (NO in above-described Step S300), the process proceeds to Step S103. In contrast, in a case where the energy remaining amount is equal to or lower than the second threshold (YES in above-described Step S300), the performing determiner 103 generates, in a case where the energy remaining amount is lower than the first threshold, support request information for causing the vehicle-interior monitoring support apparatus 20 to perform recognition by the remote recognizer 202 and determination by the remote determiner 203 in Step S301. In addition, in a case where the energy remaining amount is equal to or higher than the first threshold and equal to or lower than the second threshold, the performing determiner 103 generates support request information for causing the vehicle-interior monitoring support apparatus 20 to perform recognition by the remote recognizer 202.

In Step S302, the in-vehicle communicator 106 sends the support request information and the sensor information to the vehicle-interior monitoring support apparatus 20.

In Step S303, the in-vehicle communicator 106 receives a result of recognition by the remote recognizer 202 or a result of determination by the remote determiner 203.

In Step S304, the in-vehicle communicator 106 determines whether the result of recognition is received. In a case where the result of recognition is received (YES in above-described Step S304), the in-vehicle communicator 106 passes the received result of recognition by the remote recognizer 202 to the in-vehicle determiner 105 and the process proceeds to Step S105. In this case, the in-vehicle determiner 105 determines a situation in the interior of the vehicle 100 on the basis of the result of recognition by the remote recognizer 202 in Step S105.

In contrast, in a case where no result of recognition is received (in a case where the result of determination is received) (NO in above-described Step S304), the in-vehicle communicator 106 passes the received result of determination by the remote determiner 203 to the in-vehicle controller 107 and the process proceeds to Step S106.

FIG. 9 is a flowchart illustrating a vehicle-interior monitoring support processing routine of the vehicle-interior monitoring support apparatus 40 according to the second embodiment. It should be noted that a process similar to that of the vehicle-interior monitoring support processing routine according to the first embodiment is referred to by using a same reference sign and a detailed description thereof is omitted. The process is performed every time when the remote communicator 201 receives data from the in-vehicle unit 10.

In Step S400, the remote communicator 201 receives the sensor information and the support request information sent from the in-vehicle communicator 106.

In Step S401, the remote recognizer 202 determines whether the support request information is information for causing the remote recognizer 202 to perform recognition.

In a case where it is not the information for causing the remote recognizer 202 to perform recognition (NO in above-described Step S401), the process proceeds to Step S204.

In contrast, in a case where it is information for causing the remote recognizer 202 to perform recognition (YES in above-described Step S401), the remote communicator 201 sends a result of recognition by the remote recognizer 202, which is acquired in above-described Step S203, to the in-vehicle unit 10 in Step S402.

As described hereinbefore, the vehicle-interior monitoring system according to the second embodiment of the present disclosure: determines whether a remote process is to be performed on the basis of the acquired energy remaining amount; in a case where the remote process is determined to be performed, causes the vehicle-interior monitoring support apparatus to perform recognition by the remote recognizer and determination by the remote determiner in a case where the energy remaining amount is lower than the first threshold, whereas causing the vehicle-interior monitoring support apparatus to perform recognition by the remote recognizer in a case where the energy remaining amount is equal to or higher than the first threshold and equal to or lower than the second threshold; receives a result of recognition by the remote recognizer or a result of determination by the remote determiner; and in a case where the result of recognition by the remote recognizer is received, determines a situation in the interior of the vehicle on the basis of the result of recognition by the remote recognizer; and performs a control related to the interior of the vehicle on the basis of the result of determination. This makes it possible to perform vehicle-interior monitoring with accuracy even when the energy remaining amount is insufficient.

It should be noted that the present disclosure is not limited to the above-described embodiments and a variety of modifications and practical applications are applicable without departing from the scope of the present invention.

For example, in the above-described embodiments, the performing determiner 103 determines whether the remote process is to be performed by using only the energy remaining amount; however, this is not limiting. For example, it may be determined whether the remote process is to be performed by using a prospect for energy replenishment based on a plan for service acquired in advance. Specifically, even in a case where the current level of the energy remaining amount is low, the performing determiner 103 determines that the remote process is not to be performed as long as energy replenishment is possible at a nearby gas station or a site where electric power is available for charging. In addition, the energy replenishment also includes replenishment with an energy obtainable by a regenerative brake or the like. For example, in a case where the plan for service includes a traveling route where a first half is an upslope and a second half is a downslope, there is a prospect for energy replenishment by using a regenerative brake on the downslope. In this case, the performing determiner 103 determines that the remote process is not to be performed immediately in front of or very near the downslope even when the energy remaining amount is low (for example, equal to or lower than the first threshold). In addition, the determination may be made in accordance with a service mode of the vehicle 100 (not in service, boarding, traveling, or the like). Alternatively, the remote process may be performed in response to the occurrence of an abnormal event (a passenger moving, falling down, doing something abnormal, or the like while the vehicle 100 is traveling). In this case, a calculation imposing a heavy load is externally entrusted, which makes it possible to determine a situation in more detail and record situation data in the vehicle-interior monitoring support apparatus 20 so that it can be used for determining a situation in another vehicle.

In addition, in the above-described embodiments, it is described that only the remote inspector 204 of the vehicle-interior monitoring support apparatus 20 inspects a situation in the interior of the vehicle 100; however, this is not limiting. The in-vehicle unit 10 may be equipped with the function of the remote inspector 204. In this case, the in-vehicle unit 10 may be configured to perform inspection as long as the energy remaining amount is sufficient; otherwise, the vehicle-interior monitoring support apparatus 20 performs inspection.

In addition, in the above-described second embodiment, the performing determiner 103 generates the support request information; however, this is not limiting. For example, the energy remaining amount may be sent to the vehicle-interior monitoring support apparatus 20, the vehicle-interior monitoring support apparatus 20 including a remote performing determiner. In this case, the remote performing determiner may make a determination to cause the remote recognizer 202 to perform recognition and the remote determiner 203 to perform determination in a case where the energy remaining amount is lower than the first threshold, whereas causing the remote recognizer 202 to perform recognition in a case where the energy remaining amount is equal to or higher than the first threshold and equal to or lower than the second threshold.

In addition, the respective vehicle-interior monitoring systems according to the first embodiment and the second embodiment may be combined. For example, the performing determiner 103 may be configured to determine, in accordance with the energy remaining amount, a range being processed by the in-vehicle unit and a range being entrusted to the vehicle-interior monitoring support apparatus for processing. Specifically, with the energy remaining amount being categorized in four levels: recognition and determination may be entrusted to the vehicle-interior monitoring support apparatus at the lowest level of energy remaining amount; only determination may be entrusted to the vehicle-interior monitoring support apparatus at the second lowest level; only recognition may be entrusted to the vehicle-interior monitoring support apparatus at the third lowest level; and recognition and determination may be performed by the in-vehicle unit at the highest level of energy remaining amount. It should be noted that in this example, the recognition-only case and the determination-only case may be inverted in accordance with the amount of energy consumption based on a processing load.

In addition, in a case where the sensor is provided by a temperature, normal-abnormal determination can be made depending on whether a temperature falls within a predetermined range. In this case, if abnormal, the in-vehicle controller 107 may be configured to control a change in temperature and the output section 108 may be configured to output an order to change the temperature to an air conditioner (not illustrated) installed in the vehicle 100. It is beneficial not only in a case where the vehicle 100 carries a person but also for a truck that carries fresh food, frozen food, livestock, or the like by autonomous driving.

In addition, in the above-described embodiments, the description is made by taking as an example the case where the sensor information is an image; however, this is not limiting. In a case where audio is used, it is sufficient that audio-based recognition, determination, and inspection of a target are to be performed by, for example, a technique described in Reference Literature 4 or Reference Literature 5 below.

- [Reference Literature 4] G. Hinton, L. Deng, Y. Dong, G. E. Dahl, A. Mohamed, N. Jaitly, A. Senior, V. Vanhoucke, P. Nguyen, T. N. Sainath and B. Kingsbury, "Deep neural networks for acoustic modeling in speech recognition," IEEE Signal Processing Magazine, Vol. 29, No. 6, 2012, pp. 82-97.
- [Reference Literature 5] Proc. the Detection and Classification of Acoustic Scenes and Events 2016 Workshop (DCASE2016), Budapest, Hungary, September 2016, pp. 45-49.

In addition, in the above-described embodiments, the performing determiner 103 determines whether the remote process is to be performed in accordance with the energy remaining amount; however, this is not limiting. It may be determined whether the remote process is to be performed by comprehensively determining a variety of information, such as a prospect for energy replenishment based on a plan for service acquired in advance, attributes of a passenger, and a difficulty of a service by autonomous driving, in addition to the energy remaining amount. The prospect for energy replenishment refers to information regarding whether the vehicle 100 can be replenished with energy according to the plan for service.

In addition, criteria for performing the remote process are not dependent on the energy remaining amount in some cases. For example, the vehicle-interior monitoring support apparatus 20 may be configured to perform a high-performance monitoring process at a desired timing instead of the in-vehicle unit 10 always performing it, whereas the in-vehicle unit 10, which consumes less energy, may be configured to perform the monitoring process at any other timing.

In addition, the in-vehicle unit 10 may constantly send the sensor information, the result of recognition, and the result of determination to the vehicle-interior monitoring support apparatus 20 and the vehicle-interior monitoring support apparatus 20 may be configured to register the sensor information, the result of recognition, and the result of determination in the situation management database.

It should be noted that software (a program) read and executed by the CPU in the above-described embodiments may be executed by a variety of processors instead of the CPU. Examples of the processors in this case include a PLD (Programmable Logic Device) such as an FPGA (Field-Programmable Gate Array), which is changeable in circuit configuration after manufacturing, and a dedicated electric circuit that is a processor having a circuit configuration designed exclusively for performing a specific process, such as an ASIC (Application Specific Integrated Circuit). In addition, the above-described programs may be executed by one of the variety of processors or by a combination of two or more of the processors of the same type or different types (for example, a plurality of FPGAs, a combination of CPU and FPGA, or the like). In addition, a structure of the variety of processors in terms of hardware is, more specifically, an electric circuit with a combination of circuit elements such as a semiconductor element.

In addition, in the above-described embodiments, the description is made on a configuration where the program is stored (installed) in the ROM 12 or the storage 14 in advance; however, this is not limiting. The program may be provided as being stored in any non-transitory storage media such as a CD-ROM (Compact Disk Read Only Memory), a DVD-ROM (Digital Versatile Disk Read Only Memory), and a USB (Universal Serial Bus) memory. In addition, the above-described programs may be downloadable from an external apparatus through a network.

As for the above-described embodiments, the following appendixes are additionally disclosed.

(Appended Claim 1)

A vehicle-interior monitoring apparatus installed in a vehicle, the vehicle-interior monitoring apparatus comprising:
    a memory; and
    at least one processor communicable to the memory,
    the processor being configured to:
        acquire an energy remaining amount that is a remaining amount of an energy usable by the vehicle-interior monitoring apparatus;
        acquire sensor information regarding a target in an interior of the vehicle;
        determine whether a remote process is to be performed on a basis of the energy remaining amount;
        recognize, in a case where the remote process is determined not to be performed, the target in the interior of the vehicle on a basis of the sensor information;
        determine a situation in the interior of the vehicle on a basis of a result of recognition;
        send, in a case where the remote process is to be performed, the sensor information to a vehicle-interior monitoring support apparatus configured to perform processes similar to the recognition and the determination;
        receive a result of determination on the situation in the interior of the vehicle by the vehicle-interior monitoring support apparatus; and
        perform a monitoring control related to the interior of the vehicle on a basis of the result of determination.

(Appended Claim 2)

A non-transitory computer-readable storage medium storing a vehicle-interior monitoring program configured to cause a computer to:
    acquire an energy remaining amount that is a remaining amount of an energy usable by the computer;
    acquire sensor information regarding a target in an interior of a vehicle;
    determine whether a remote process is to be performed on a basis of the energy remaining amount;
    recognize the target in the interior of the vehicle on a basis of the sensor information in a case where the remote process is determined not to be performed;
    determine a situation in the interior of the vehicle on a basis of a result of recognition;
    send, in a case where the remote process is determined to be performed, the sensor information to a vehicle-interior monitoring support apparatus configured to perform processes similar to the recognition and the determination;
    receive a result of determination on the situation in the interior of the vehicle by the vehicle-interior monitoring support apparatus; and
    perform a monitoring control related to the interior of the vehicle on a basis of the result of determination.

(Appended Claim 3)

A vehicle-interior monitoring support apparatus comprising
    a remote communicator, a remote recognizer, and a remote determiner,
    the remote communicator being configured to receive sensor information regarding a target in an interior of a vehicle from a vehicle-interior monitoring apparatus configured to monitor the interior of the vehicle,
    the remote recognizer being configured to recognize the target in the interior of the vehicle on a basis of the sensor information received by the remote communicator,
    the remote determiner being configured to determine a situation in the interior of the vehicle on a basis of a result of recognition by the remote recognizer,
    the remote communicator being configured to send a result of determination by the remote determiner to the vehicle-interior monitoring apparatus.

(Appended Claim 4)

A vehicle-interior monitoring method wherein:
    an energy acquirer of an in-vehicle unit acquires an energy remaining amount that is a remaining amount of an energy usable by the in-vehicle unit, the in-vehicle unit being installed in a vehicle;
    an in-vehicle acquirer of the in-vehicle unit acquires sensor information regarding a target in an interior of the vehicle;
    a performing determiner of the in-vehicle unit determines whether a remote process is to be performed on a basis of the energy remaining amount;
    an in-vehicle recognizer of the in-vehicle unit recognizes, in a case where the performing determiner determines that the remote process is not to be performed, the target in the interior of the vehicle on a basis of the sensor information;

an in-vehicle determiner of the in-vehicle unit determines a situation in the interior of the vehicle on a basis of a result of recognition by the in-vehicle recognizer;

an in-vehicle communicator of the in-vehicle unit sends, in a case where the performing determiner determines that the remote process is to be performed, the sensor information to a vehicle-interior monitoring support apparatus;

a remote communicator of the vehicle-interior monitoring support apparatus receives the sensor information;

a remote recognizer of the vehicle-interior monitoring support apparatus recognizes the target in the interior of the vehicle on a basis of the sensor information received by the remote communicator;

a remote determiner of the vehicle-interior monitoring support apparatus determines the situation in the interior of the vehicle on a basis of a result of recognition of the remote recognizer;

the remote communicator sends a result of determination by the remote determiner to the in-vehicle unit;

the in-vehicle communicator receives the result of determination by the remote determiner; and an in-vehicle controller of the in-vehicle unit performs a monitoring control related to the interior of the vehicle on a basis of the result of determination by the in-vehicle determiner or the result of determination by the remote determiner.

Although the present disclosure is described with reference to embodiments, it should be understood that the present disclosure is not limited to the embodiments and configurations. The present disclosure embraces various modifications examples and modifications within the range of equivalency. Additionally, various combinations and forms and, further, other combinations and forms including only a single element or more or less in addition thereto are also within the spirit and scope of the present disclosure.

What is claimed is:

1. A vehicle-interior monitoring system comprising
an in-vehicle unit installed in a vehicle and a vehicle-interior monitoring support apparatus,
the in-vehicle unit comprising an energy acquirer, an in-vehicle acquirer, a performing determiner, an in-vehicle recognizer, an in-vehicle determiner, an in-vehicle communicator, and an in-vehicle controller,
the vehicle-interior monitoring support apparatus comprising a remote communicator, a remote recognizer, and a remote determiner,
the energy acquirer being configured to acquire an energy remaining amount that is a remaining amount of an energy usable by the in-vehicle unit,
the in-vehicle acquirer being configured to acquire sensor information regarding a target in an interior of the vehicle,
the performing determiner being configured to determine whether a remote process is to be performed on a basis of the energy remaining amount,
the in-vehicle recognizer being configured to recognize, in a case where the performing determiner determines that the remote process is not to be performed, the target in the interior of the vehicle on a basis of the sensor information,
the in-vehicle determiner being configured to determine a situation in the interior of the vehicle on a basis of a result of recognition by the in-vehicle recognizer,
the in-vehicle communicator being configured to send, in a case where the performing determiner determines that the remote process is to be performed, the sensor information to the vehicle-interior monitoring support apparatus,
the remote communicator being configured to receive the sensor information,
the remote recognizer being configured to recognize the target in the interior of the vehicle on a basis of the sensor information received by the remote communicator,
the remote determiner being configured to determine the situation in the interior of the vehicle on a basis of a result of recognition by the remote recognizer,
the remote communicator being configured to send a result of determination by the remote determiner to the in-vehicle unit,
the in-vehicle communicator being configured to receive the result of determination by the remote determiner,
the in-vehicle controller being configured to perform a monitoring control related to the interior of the vehicle on a basis of a result of determination by the in-vehicle determiner or the result of determination by the remote determiner.

2. The vehicle-interior monitoring system according to claim 1, wherein:
the in-vehicle recognizer is configured to recognize the target in the interior of the vehicle on the basis of the sensor information;
the in-vehicle determiner is configured to determine, in a case where the performing determiner determines that the remote process is not to be performed, the situation in the interior of the vehicle on the basis of the result of recognition by the in-vehicle recognizer;
the in-vehicle communicator is configured to send, in a case where the performing determiner determines that the remote process is to be performed, the result of recognition by the in-vehicle recognizer to the vehicle-interior monitoring support apparatus;
the remote communicator receives the result of recognition; and
the remote determiner is configured to determine the situation in the interior of the vehicle on a basis of the result of recognition received by the remote communicator.

3. The vehicle-interior monitoring system according to claim 2, wherein
the performing determiner is configured to cause the in-vehicle communicator to send the sensor information to the vehicle-interior monitoring support apparatus in a case where the energy remaining amount is lower than a first threshold and causes the in-vehicle communicator to send the result of recognition by the in-vehicle recognizer to the vehicle-interior monitoring support apparatus in a case where the energy remaining amount is equal to or higher than the first threshold and equal to or lower than a second threshold.

4. The vehicle-interior monitoring system according to claim 1, wherein:
the remote communicator is configured to send the result of recognition by the remote recognizer to the in-vehicle unit;

the in-vehicle communicator is configured to receive the result of recognition by the remote recognizer; and the in-vehicle determiner is configured to determine, in a case where the performing determiner determines that the remote process is to be performed, the situation in the interior of the vehicle on the basis of the result of recognition by the remote recognizer.

5. The vehicle-interior monitoring system according to claim 4, wherein the performing determiner is configured to cause the vehicle-interior monitoring support apparatus to perform recognition by the remote recognizer and determination by the remote determiner in a case where the energy remaining amount is lower than a first threshold, whereas causing the vehicle-interior monitoring support apparatus to perform the recognition by the remote recognizer in a case where the energy remaining amount is equal to or higher than the first threshold and equal to or lower than a second threshold.

6. The vehicle-interior monitoring system according to claim 1, wherein the performing determiner is configured to determine whether the remote process is to be performed in accordance with the energy remaining amount and a prospect for energy replenishment based on a plan for service acquired in advance.

7. The vehicle-interior monitoring system according to claim 1, wherein the remote recognizer is configured to recognize the target by using a means of recognition that is higher in accuracy than a means of recognition used by the in-vehicle recognizer.

8. The vehicle-interior monitoring system according to claim 1, wherein:

the vehicle-interior monitoring support apparatus further comprises a remote inspector and a support controller;

the remote determiner being configured to determine whether the situation in the interior of the vehicle is 'normal' or 'abnormal' on a basis of the result of recognition by the in-vehicle recognizer or the result of recognition by the remote recognizer;

the remote inspector is configured to inspect, in a case where the result of determination by the remote determiner is 'abnormal', a degree of abnormality of the situation in the interior of the vehicle is on the basis of the result of recognition by the remote recognizer; and the support controller is configured to generate support information for supporting the vehicle in accordance with a result of inspection by the remote inspector.

9. The vehicle-interior monitoring system according to claim 1, wherein the in-vehicle controller is configured to perform at least one of giving a caution, giving a countermeasure instruction, and changing a temperature on the basis of the result of determination by the in-vehicle determiner or the remote determiner.

10. A vehicle-interior monitoring apparatus installed in a vehicle, the vehicle-interior monitoring apparatus comprising an energy acquirer, an in-vehicle acquirer, a performing determiner, an in-vehicle recognizer, an in-vehicle determiner, an in-vehicle communicator, and an in-vehicle controller, the energy acquirer being configured to acquire an energy remaining amount that is a remaining amount of an energy usable by the vehicle-interior monitoring apparatus, the in-vehicle acquirer being configured to acquire sensor information regarding a target in an interior of the vehicle, the performing determiner being configured to determine whether a remote process is to be performed on a basis of the energy remaining amount, the in-vehicle recognizer being configured to recognize, in a case where the performing determiner determines that the remote process is not to be performed, the target in the interior of the vehicle on a basis of the sensor information, the in-vehicle determiner being configured to determine a situation in the interior of the vehicle on a basis of a result of recognition by the in-vehicle recognizer, the in-vehicle communicator being configured to send, in a case where the performing determiner determines that the remote process is to be performed, the sensor information to a vehicle-interior monitoring support apparatus configured to perform similar processes to recognition by the in-vehicle recognizer and determination by the in-vehicle determiner, the in-vehicle communicator being configured to receive a result of determination on the situation in the interior of the vehicle by the vehicle-interior monitoring support apparatus, the in-vehicle controller being configured to perform a monitoring control related to the interior of the vehicle on a basis of a result of determination by the in-vehicle determiner or the result of determination by the vehicle-interior monitoring support apparatus.

11. A non-transitory computer-readable storage medium storing a vehicle-interior monitoring program for causing a computer to perform a process, the process comprising:

an energy acquirer acquiring an energy remaining amount that is a remaining amount of an energy usable by a computer;

an in-vehicle acquirer acquiring sensor information regarding a target in an interior of a vehicle;

a performing determiner determining whether a remote process is to be performed on a basis of the energy remaining amount;

an in-vehicle recognizer recognizing the target in the interior of the vehicle on a basis of the sensor information in a case where the performing determiner determines that the remote process is not to be performed;

an in-vehicle determiner determining a situation in the interior of the vehicle on a basis of a result of recognition by the in-vehicle recognizer;

an in-vehicle communicator sending, in a case where the performing determiner determines that the remote process is to be performed, the sensor information to a vehicle-interior monitoring support apparatus configured to perform similar processes to recognition by the in-vehicle recognizer and determination by the in-vehicle determiner;

an in-vehicle communicator receiving a result of determination on the situation in the interior of the vehicle by the vehicle-interior monitoring support apparatus; and an in-vehicle controller performing a monitoring control related to the interior of the vehicle on a basis of a result of determination by the in-vehicle determiner or the result of determination by the vehicle-interior monitoring support apparatus.

* * * * *